(12) United States Patent
Ng

(10) Patent No.: US 8,801,320 B2
(45) Date of Patent: Aug. 12, 2014

(54) SELF BIASED JOINT AND METHOD

(75) Inventor: Peter Ng, Hong Kong (CN)

(73) Assignee: Koncept Technologies Inc., Monrovia, CA (US)

( * ) Notice: Subject to any disclaimer, the term of this patent is extended or adjusted under 35 U.S.C. 154(b) by 210 days.

(21) Appl. No.: 13/533,862

(22) Filed: Jun. 26, 2012

(65) Prior Publication Data

US 2013/0343806 A1 Dec. 26, 2013

(51) Int. Cl.
*F16C 11/00* (2006.01)
*F16D 3/00* (2006.01)

(52) U.S. Cl.
USPC ...... 403/111; 403/120; 403/146; 248/292.12; 248/292.13; 16/289; 16/306; 16/401; 74/89.11

(58) Field of Classification Search
USPC ......................... 403/111, 120, 121, 145, 146; 362/285–289; 16/289, 290, 296, 298, 16/306, 308; 248/288.11, 288.51, 292.12, 248/292.13; 74/89.11, 89.16–89.18, 422, 74/490.01, 490.05; 267/154, 155, 157
See application file for complete search history.

(56) References Cited

U.S. PATENT DOCUMENTS

| | | | | |
|---|---|---|---|---|
| 2,395,178 A | * | 2/1946 | Fiori | 248/597 |
| 3,593,952 A | * | 7/1971 | Smith | 248/214 |
| 4,260,189 A | * | 4/1981 | Periou et al. | 296/223 |
| 5,566,048 A | * | 10/1996 | Esterberg et al. | 361/679.27 |
| 5,809,697 A | * | 9/1998 | Chen | 49/386 |
| 5,971,652 A | * | 10/1999 | Bartlett et al. | 403/84 |
| 6,837,468 B1 | * | 1/2005 | Kantor et al. | 248/278.1 |
| 7,685,680 B2 | * | 3/2010 | Chien et al. | 16/361 |
| 2002/0125381 A1 | * | 9/2002 | Yoon | 248/163.1 |
| 2006/0223596 A1 | * | 10/2006 | Hur | 455/575.4 |
| 2009/0122550 A1 | * | 5/2009 | Gordin et al. | 362/285 |
| 2009/0268383 A1 | * | 10/2009 | Zhang et al. | 361/679.01 |
| 2010/0096519 A1 | * | 4/2010 | Oh et al. | 248/201 |
| 2010/0251519 A1 | * | 10/2010 | Duffy | 16/304 |

* cited by examiner

*Primary Examiner* — Daniel P Stodola
*Assistant Examiner* — Jonathan Masinick
(74) *Attorney, Agent, or Firm* — Foley & Lardner LLP

(57) ABSTRACT

A joint device connects a first and second members and allows pivotal motion of one or both members. The joint device includes a housing having a slide surface and a guide surface. First and second rotating members are supported for rotation by the housing to pivot one or both members. A slide member carrying a spring is supported for movement on the slide surface with rotation of the rotating members. The spring is coupled to the first rotating member, and has an arm arranged for movement along the guide surface as the slide member moves along the slide surface. The spring member imparts a bias torque on the first rotating member, where the bias torque magnitude changes as the slide member moves along the slide surface.

16 Claims, 13 Drawing Sheets

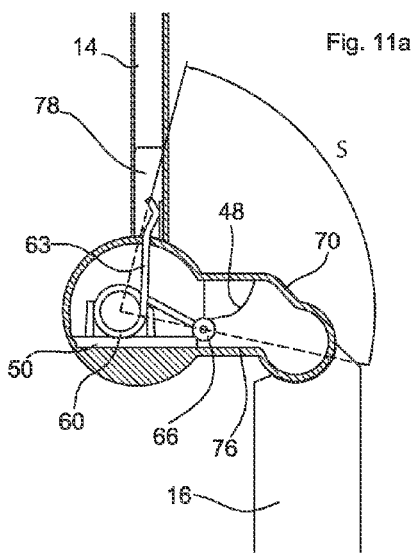
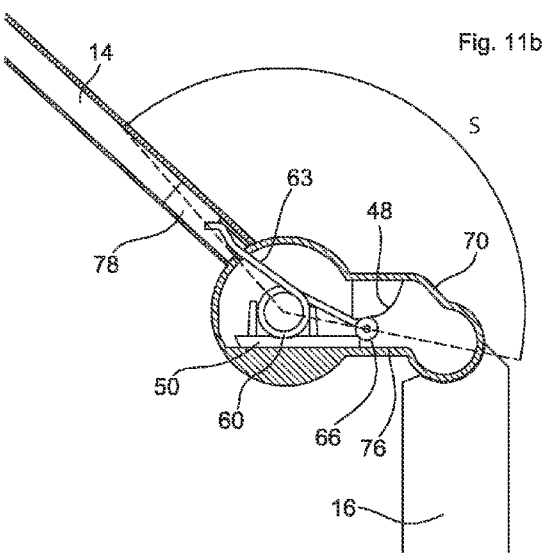
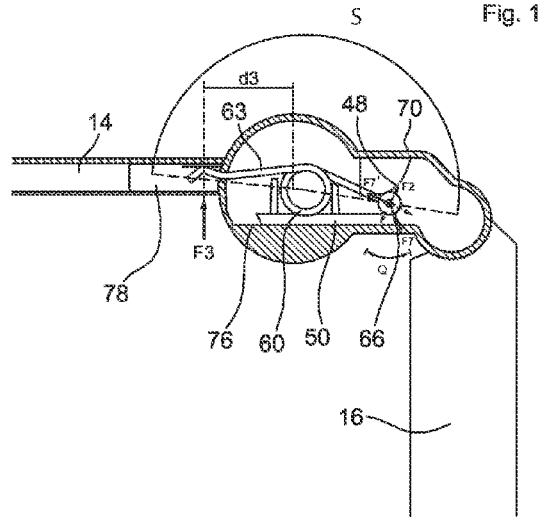
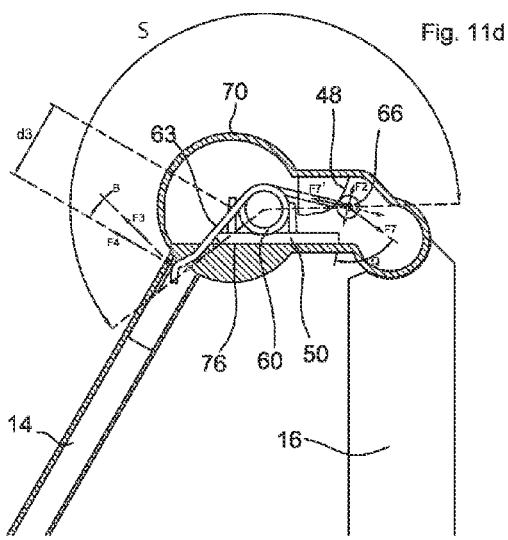
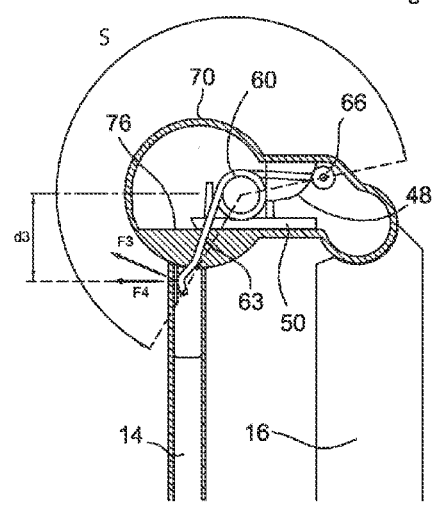

US 8,801,320 B2

SELF BIASED JOINT AND METHOD

BACKGROUND OF THE INVENTION

1. Field of the Invention

The present invention relates to joints for connecting two members for pivotal motion relative to each other and, in particular embodiments, to joints that provide a bias torque that changes with changes in position along the pivotal motion of the two members. In certain embodiments, the bias torque is selected to equal, but oppose, other torques acting on one or both of the members, such as a torque created by gravity on one or both of the members. Further embodiments are directed to methods of making and using such joints.

2. Related Art

Connection joints for connecting two members for relative pivotal motion have been used in a variety of contexts, including, but not limited to consumer items, industrial equipment, military equipment and the like. In many contexts, it is desirable for the pivotal member to be able to pivot to any one of multiple pivot positions, and then remain in the desired position, without external support. In other words, in certain contexts it is desirable for the pivot member to be self-supporting or self-balancing at any one of multiple pivot positions.

Thus, for example, a light emitting device, a tool, a weapon or other suitable implement carried on a pivotal support arm, may be moved to a desired pivot position, by pivoting the support arm. Once moved to the desired position, it can be further desirable for the arm to remain in that position, without requiring external support to do so. Accordingly, certain joints have been formed with threaded nuts that can be tightened on a threaded shaft to grip and hold an arm in a desired position.

SUMMARY OF THE DISCLOSURE

A joint device according to particular embodiments of the present invention connects a first member and a second member, and allows pivotal motion of one or both members. The first and second members may be, for example, an arm member and a leg member, respectively, where the arm member is coupled, by the joint device, to the leg member for pivotal motion. However, a joint device according to other embodiments may be arranged to connect other members together, for pivotal motion.

Embodiments of a joint structure described herein are configured to be self-biased, so as to maintain a pivot position of the arm (or other member) against external forces, such as, but not limited to gravity. Furthermore, embodiments of a joint structure described herein are configured to provide a varying bias that changes with changes in the pivot position of the arm (or other member), to provide appropriate self-biasing at each pivot position of the arm (or other member).

The joint device according to embodiments of the present invention includes a housing that has or contains a slide surface and a guide surface. First and second rotating members are supported for rotation by the housing. The first and second rotating members are connected to, for example, the arm member, to pivot the arm member with rotation of the first and second rotating members.

A slide member is supported for movement on the slide surface and moves in correspondence with rotation of the first and second rotating members. A spring member is supported on the slide member to move with the slide member. The spring member is coupled to the first rotating member, and has a spring arm arranged for movement along the guide surface as the slide member moves along the slide surface.

The spring member imparts a bias torque on the first rotating member, where the bias torque has a magnitude that changes as the slide member moves along the slide surface.

In particular embodiments, the spring member is selected such that the bias torque applied by the spring member on the first rotating member is equal to and opposite an external force, such as gravity, acting on the arm member. In addition, the torque applied by the spring member changes, with changes in the rotary position of the rotating member (and, thus, with changes in the pivot position of an arm or other member attached to the rotating member). In that manner, the joint device can be configured to provide a self-balancing effect, wherein the pivotal arm member (or other member) attached to the rotating member maintains its pivot position against the force of gravity, at each pivot position of the arm (or other) member.

BRIEF DESCRIPTION OF THE DRAWINGS

FIGS. 11a-e are schematic diagrams representing the joint of FIG. 1, at various pivot positions, including bias forces imparted by the bias member.

DETAILED DESCRIPTION OF THE EMBODIMENTS

In the following description of preferred embodiments, reference is made to the accompanying drawings which form a part hereof and in which are shown by way of illustration specific embodiments in which the invention may be practiced. It is to be understood that other embodiments may be utilized and structural changes may be made without departing from the scope of the preferred embodiments of the present invention.

Embodiments of the present invention relates to a joint for connecting two members and for allowing one or both of the members to pivot relative to the other member. Further embodiments of the present invention relate to devices and systems that include one or more of such joints. Yet further embodiments of the present invention relate to methods of making and using such joints, devices and systems.

A joint according to particular embodiments of the invention provides a bias torque that changes as the relative pivotal position of the two members changes. In certain embodiments, the bias torque is selected to approximately equal, but oppose, one or more other torques acting on one or both of the members, such as torque created by gravity acting on one or both of the members. In other embodiments, the other torque(s) acting on one or both of the members may be created by other forces, other than gravity, including, but not limited to, air pressure, manual or mechanical pressure, electromechanical force, magnetic or electromagnetic force or the like.

Figure 1:
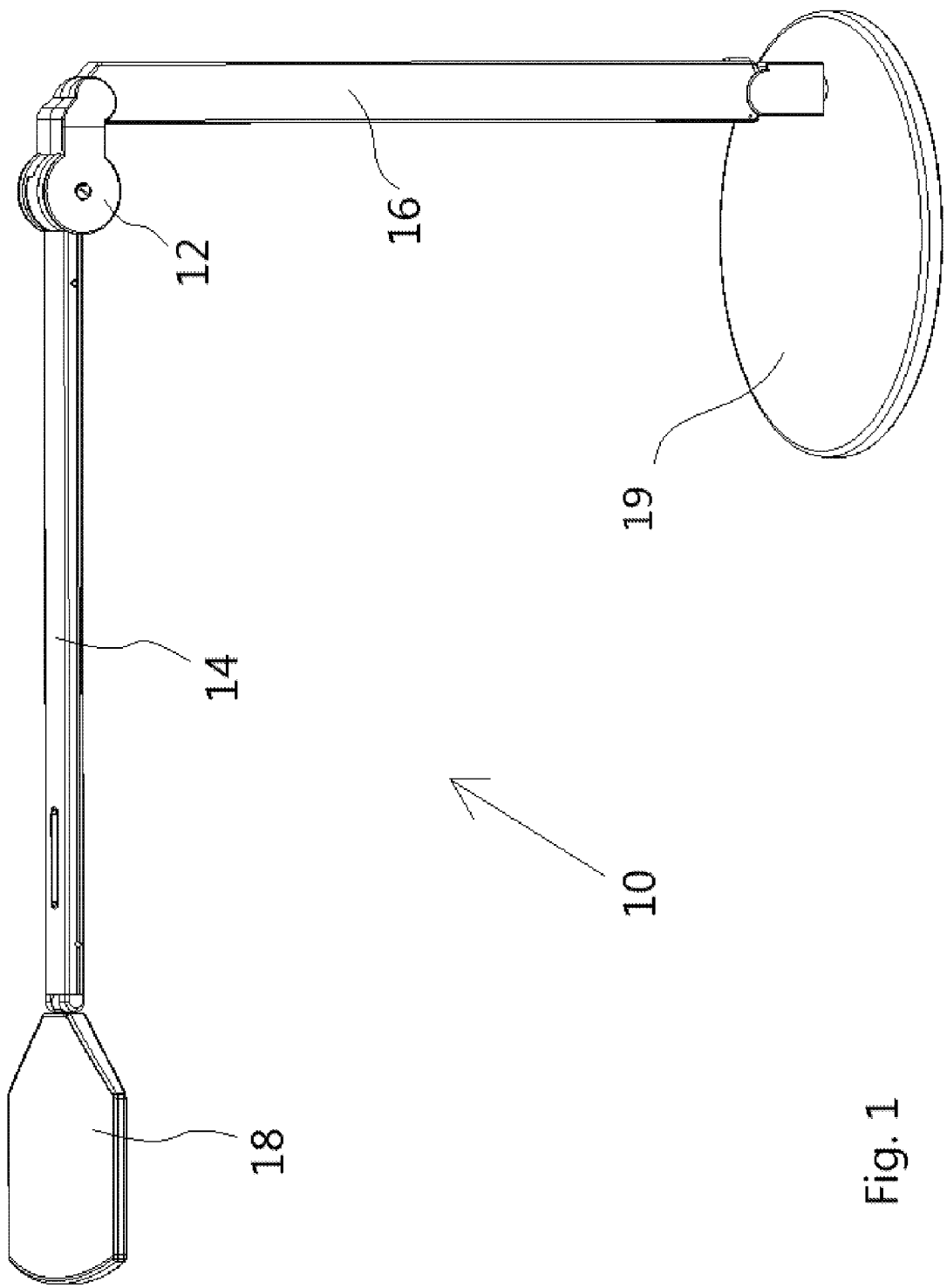
FIG. 1 is a perspective view of a lamp structure having a joint according to an embodiment of the present invention.

A joint according to embodiments of the present invention may be employed in a variety of useful applications, devices and systems, where two members are coupled together for pivotal motion. As a representative example, a joint 12 according to an embodiment of the present invention is shown in FIG. 1, as connecting arm and leg members of an electrical lamp 10. However, in other embodiments, the joint 12 may be configured for connecting other members in other devices or systems, such as, but not limited to connecting one or more tools, weapons, or other implement to an arm or other member, or connecting two arm sections of a complete arm or two leg sections of a complete leg.

In the lamp 10 of FIG. 1, the joint 12 connects an arm member 14 to a leg member 16, and allows the arm member 14 to pivot relative to the leg member 16. The lamp 10 in FIG. 1 includes a light fixture housing 18 that holds one or more electronic light emitting devices. The light fixture housing 18 is attached to a first end of the arm member 14. A second end of the arm member 14 is connected to the joint 12.

The leg member 16 is attached, at a first end, to a base 19. A second end of the leg member 16 is attached to the joint 12. Due to the connection through the joint 12, the arm member 14 is pivotally coupled to the leg member 16, such that the arm member may be manually pivoted to selectively raise or lower the first end of the arm member 14 and, thus, raise and lower the light fixture housing 18 attached to the first end of the arm member 14.

In FIG. 1, the arm member 14 is pivotally supported by the joint 12 in a position where gravity acts, in a downward direction, on the mass of the arm member 14 and the light fixture housing 18. However, the joint 12 is configured to bias the arm member 14 in the opposite direction, to counter-act the effect of gravity on the arm member 14 and light fixture housing 18. In particular embodiments, a bias torque provided by the joint 12 on the arm 14 is equal and opposite to the torque on the arm member created by gravity acting on the arm member 14 and the housing 18, such that the arm member 14 may remain self-balanced, in a horizontal or partially horizontal position, without falling downward with gravity.

The force of gravity on the arm 14 and the light fixture housing 18 produces a torque (about the pivot axis of the joint 12) that changes as the pivotal position of the arm member 14 changes. Accordingly, as described in further detail, below, the joint 12 is configured to provide an overall bias torque on the arm member 14 that changes in a corresponding manner, as the pivotal position of the arm member 14 changes, to provide a self-balancing effect at each pivotal position of the arm member 14.

In the embodiment of FIG. 1, the arm member 14 and the leg member 16 each have a longitudinal dimension extending from the first end to the second end of the member, and a generally rectangular cross-section. However, in other embodiments, the arm member 14 and the leg member 16 may have other suitable shapes and dimensions. Each of the arm member 14, the leg member 16, the light fixture housing 18 and the base may be made of any one or more suitably rigid materials including, but not limited to metal, plastic, wood, glass or other ceramic, composite material or the like.

In particular embodiments, the arm member 14 and/or the leg member 16 may have a hollow, tubular configuration, including a hollow passage along and through the length dimension of the member. Electrical wires or other suitable conductors (not shown) may extend through the hollow passage(s), to connect electrical power to the light emitting device(s) in the light fixture housing 18. Thus, for example, electrically conductive wires may be connected, at one end, to light emitting device receptacle(s) in the light fixture housing 18, and may extend through the arm member 14, the joint 12 and the leg member 16, and out from the leg member 16 (or the base 19), to a standard electrical plug (not shown). An electrical switch may be placed along the conductors, to allow selective, manual switching of electrical power on or off (to selectively connect or disconnect the electrical power to the light emitting device receptacle(s)).

In the embodiment of FIG. 1, the light fixture housing 18 is shown as having a generally oval-dome shape. However, in other embodiments, the light fixture housing 18 may have other suitable shapes and dimensions. In further embodiments, the light fixture housing may be incorporated in the arm member 14 and/or one or more light emitting devices may be mounted directly to the arm member 14. The light fixture housing 18 (or arm member 14) may support any suitable light emitting device, including, but not limited to one or more light emitting diode (LED), array of LEDs, incandescent bulb, fluorescent bulb, or various combinations thereof. In addition, the light fixture housing 18 includes suitable electrical receptacles and connections to electrical conductors discussed above, for connecting electrical power to the light emitting device(s).

In the embodiment of FIG. 1, the base 19 is configured to rest on a flat, horizontal surface, such as, but not limited to, a desk or table top. The base 19 may have a weight suitable for supporting the lamp 10 in an upright position, when the base 19 is resting on a flat surface. Alternatively or in addition, the base 19 may include mounting structure (such as, but not limited to screw holes, clamps, brackets or the like) for use in mounting the base 19 to the flat surface. In other embodiments, the base 19 may be configured to mount to one or more other suitable surfaces, including, but not limited to an uneven surface, a ceiling surface, a vertical surface or an angled surface. In further embodiments, the base 19 may include a clamp or other mounting structure for mounting over an edge of a table, desk, shelf or the like. The base 19 shown in FIG. 1 has a generally flat, round shape (or disk shape). In other embodiments, the base 19 may have other suitable shapes and dimensions.

The joint 12 is configured to connect to each of the arm member 14 and the leg member 16. In particular, the joint 12 includes a first connection structure to connect with the arm member 14 and a second connection structure to connect with the leg member 16. In the example embodiment shown in the drawings, the first connection structure includes a pair of prong-like projections or extensions 20 and 22, a connection hole 24 through the arm member 14 and a connection pin, rivet or bolt 26 (see, e.g., FIG. 2). Each of the extensions 20 and 22 has a hole 20' and 22', respectively, near the free end of the extension.

Figure 2:
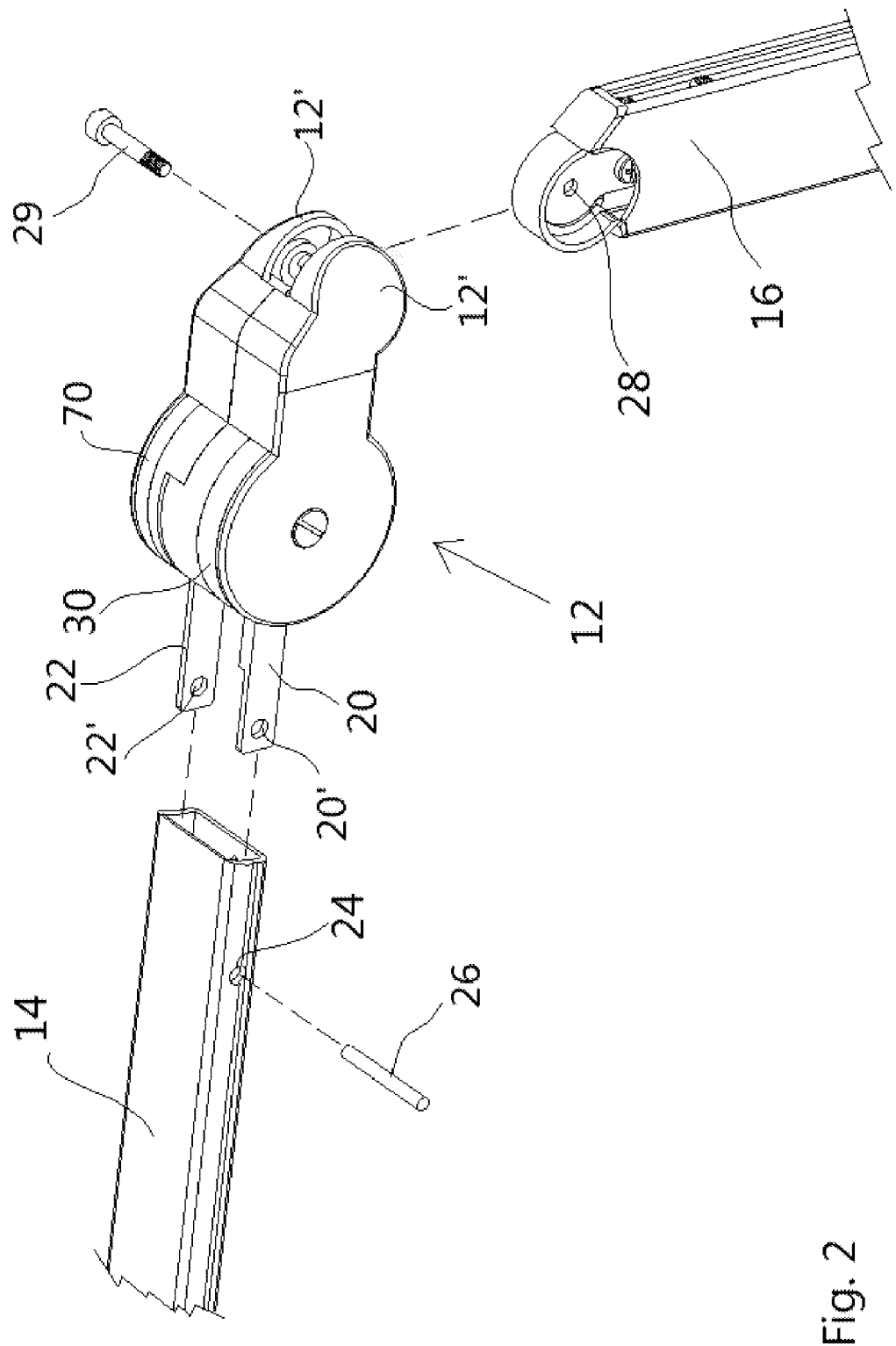
FIG. 2 is a perspective, partially exploded view of the portion of the lamp structure of FIG. 1 where the joint is located.

As shown in FIG. 2, the extensions 20 and 22 are shaped to fit through an open end and into a hollow interior of the arm member 14. When fit within the arm member 14, the extensions 20 and 22 are arranged such that the holes 20' and 22' in the extensions align with the hole 24 in the arm member 14. In that aligned arrangement, the connection pin, rivet or bolt 26 extends through the holes 24, 20' and 22', to connect the arm member 14 to the joint 12.

The connection pin, rivet or bolt 26 has a head on one end of a size or shape that will not pass through the hole 24. A similar head may be formed or connected to the other end of the connection pin, rivet or bolt 26, after the shaft of the connection pin, rivet or bolt 26 is passed through the hole 24, to secure the pin, rivet or bolt 26 to the arm member 14. Alternatively, or in addition, the shaft portion of the pin, rivet or bolt 26 may be configured slightly larger (in diameter) than the hole 24, such that the pin, rivet or bolt 26 is forced into the hole 24 and forms a friction fitted connection. Alternatively, or in addition, the connection pin, rivet or bolt 26 may be threaded and configured to engage, in a screw-threading manner, a nut or other threaded member to secure the connection pin, rivet or bolt 26 to the arm member 14.

The second connection structure in the example embodiment shown in the drawings includes a pair of ear-like projecting portions 12' of the joint 12, a connection hole 28 through the leg member 16 and a threaded connection bolt 29. As described in more detail, below, a connection hole is provided through one of the ear-like projections 12', while the other ear-like projection 12' has a threaded receptacle for receiving the threaded end of the connection bolt 29. An end portion of the leg member 16 is configured to fit between the pair of ear-like projections 12', such that the connection hole 28 aligns with the connection hole and threaded receptacle in the ear-like projections 12'. In the aligned arrangement, the threaded end of the connection bolt 29 is passed through the connection opening in the one ear-like projection 12', through the connection opening 28 in the leg member 16, and into the threaded receptacle in the other ear-like projection, to connect the joint 12 to the leg member 16. By threading the connection bolt 29 into the threaded receptacle, the joint 12 may be secured to the leg member 16.

While the example of the first connection structure shown in the drawings includes the extensions 20, 22, connection hole 24 and connection pin, rivet or bolt 26, other embodiments have other suitable structures for connecting the joint 12 to the arm member 14, including, but not limited to, screws, brackets, clamps, adhesive materials, or the like. Similarly, while the example of the second connection structure shown in the drawings includes the pair of ear-like projecting portions 12', connection hole 28 and threaded connection bolt 29, other embodiments have other suitable structures for connecting the joint 12 to the leg member 16, including, but not limited to, screws, brackets, clamps, adhesive materials, or the like.

Figure 3:
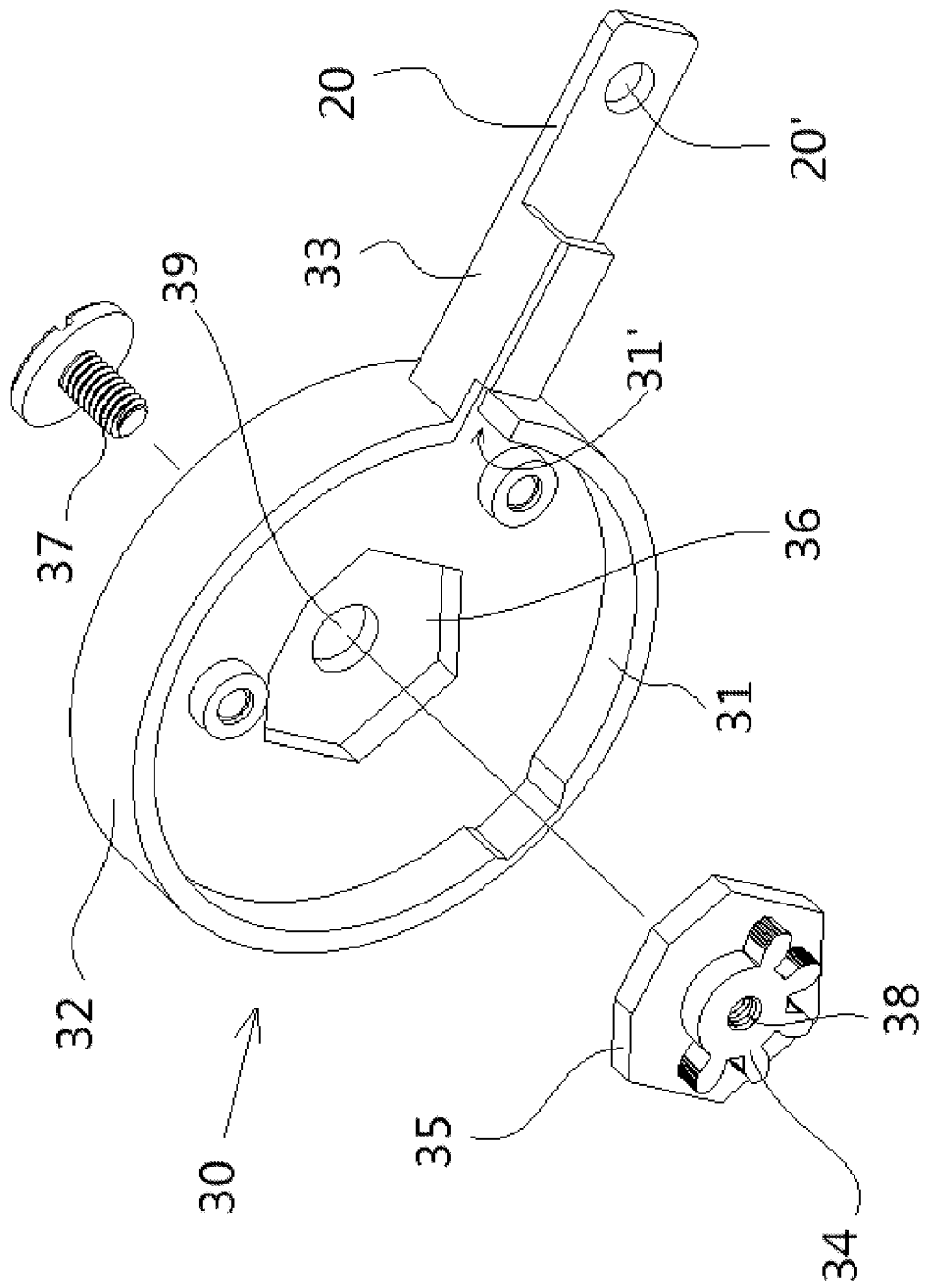
FIG. 3 is a perspective, partially exploded view of a first rotating member of the joint structure in FIG. 1.

The components and assembly of a joint 12 according to an example embodiment of the present invention are described with reference to FIGS. 3-9. The joint 12 includes a first rotating member 30, as shown in FIG. 3. The first rotating member 30 includes a body portion 32 and an extension portion 33. At least a portion (or all) of the length of the extension portion 33 forms the extension 20 discussed above, and includes the connecting hole 20' discussed above. The body portion 32 has an annular wall or flange 31 that has an opening 31' located where the extension portion 33 extends from the body portion 32.

A first gear member 34 is affixed to the center of the body portion 32 of the first rotating member 30. For example, in one embodiment, the first gear member 34 is formed integral with the body portion 32. In other embodiments, such as, but not limited to the embodiment of FIG. 3, the first gear member 34 is formed separate from the body portion 32 and is then connected to the center of the body portion 32 by suitable connection structure. One example of a connection structure for connecting the first gear member 34 to the center of the body portion 32 according to an embodiment of the present invention is shown in FIG. 3. However, other embodiments may employ other suitable structure for connecting the first gear member 34 to the body portion 32, such as, but not limited to screws, rivets, adhesive materials, or the like.

In the embodiment of FIG. 3, the first gear member 34 is fixed to (connected to or integral with) a shaped base member 35. A correspondingly shaped recess 36 is provided in the center of the body portion 32, for receiving the shaped base member 35. The shapes of the base member 35 and the recess 36 are configured to inhibiting rotation of the base member 35 relative to the body portion 32, when the base member 35 is received within the recess 36. Accordingly, when the base member 35 is received within the recess 36, the first gear member 34 does not rotate relative to the first rotating member 30, but may be rotated with the first rotating member 30, as described below.

A threaded hole 38 is provided through the base member 35 and the gear member 34. The threaded hole 38 aligns with a hole 39 in the center of the body portion 32 of the first rotating member 30. When the base portion 35 is received within the recess 36 and the holes 38 and 39 are aligned, the threaded end of a bolt is passed through the hole 39 and into the threaded hole 38 to engage, in a screw-threading manner, with the base member 35 and gear member 34, as discussed below with respect to FIG. 4.

When assembled, the first gear member 34 and first rotating member 30 are received within a slot-shaped opening in a portion of the housing of the joint 12. For example, with reference to FIG. 4 the housing of the joint 12 includes a first housing shell 40. A second housing shell 70 is described below with reference to FIG. 7, where the two housing shells 40 and 70 connect together to form the housing of the joint 12, as described below with reference to FIG. 8.

Figure 4:
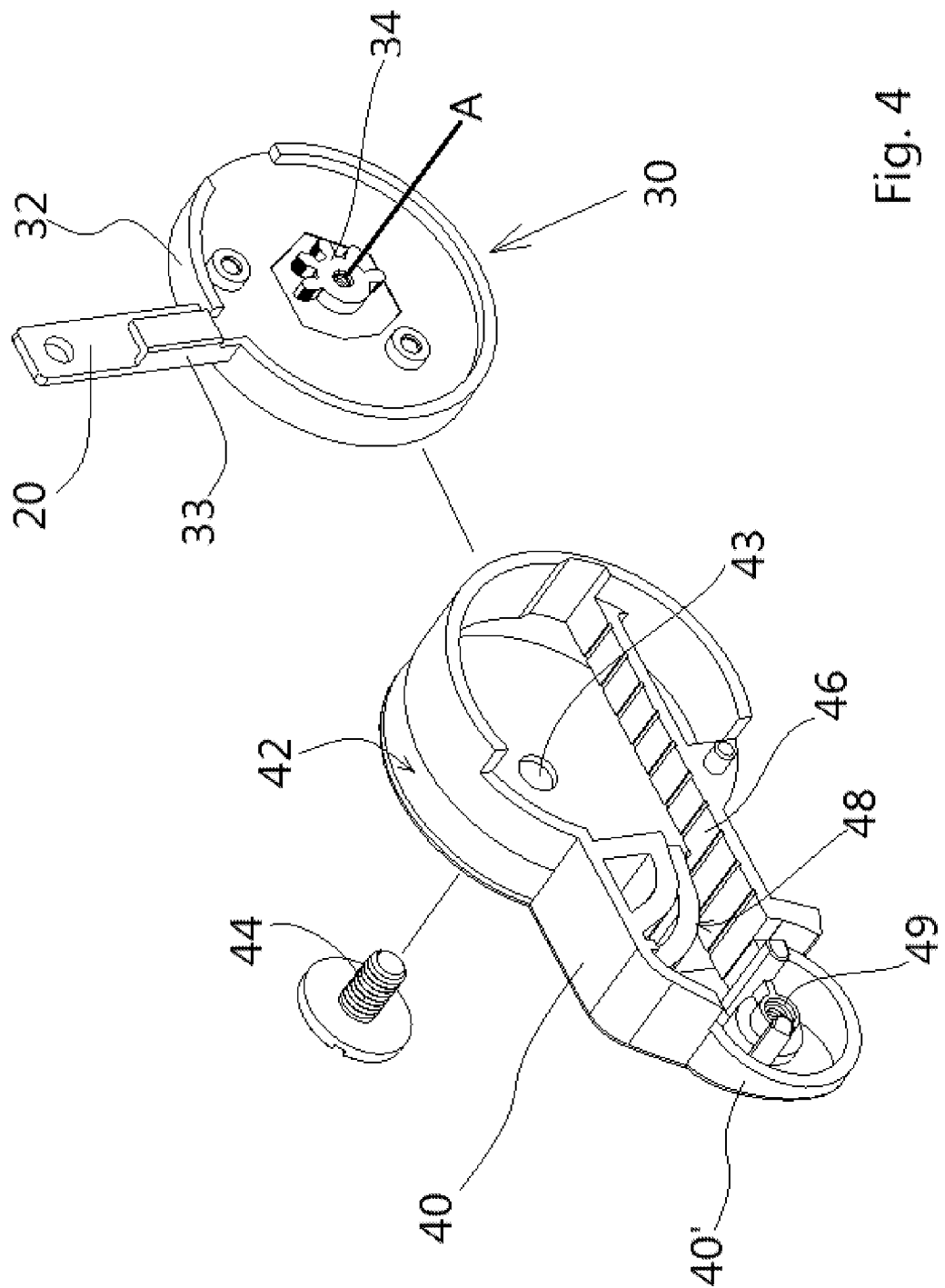
FIG. 4 is a perspective, partially exploded view of a first housing shell and the first rotating member of the joint structure in FIG. 1.

As shown in FIG. 4, the first housing shell 40 includes a slot-shaped opening 42 having a shape and size for receiving the body portion 32 of the first rotating member 30. The first housing shell 40 also includes a hole 43 that aligns with the holes 39 and 38, when the body portion 32 is received within the slot-shaped opening 42. When the holes 43, 39 and 38 are aligned, the threaded shaft of a bolt 44 is passed through the holes 43 and 39 and is threaded into the threaded hole 38, to secure the first rotating member 30 to the first housing shell 40, while allowing the first rotating member 30 to rotate within the housing shell 40.

Figure 5:
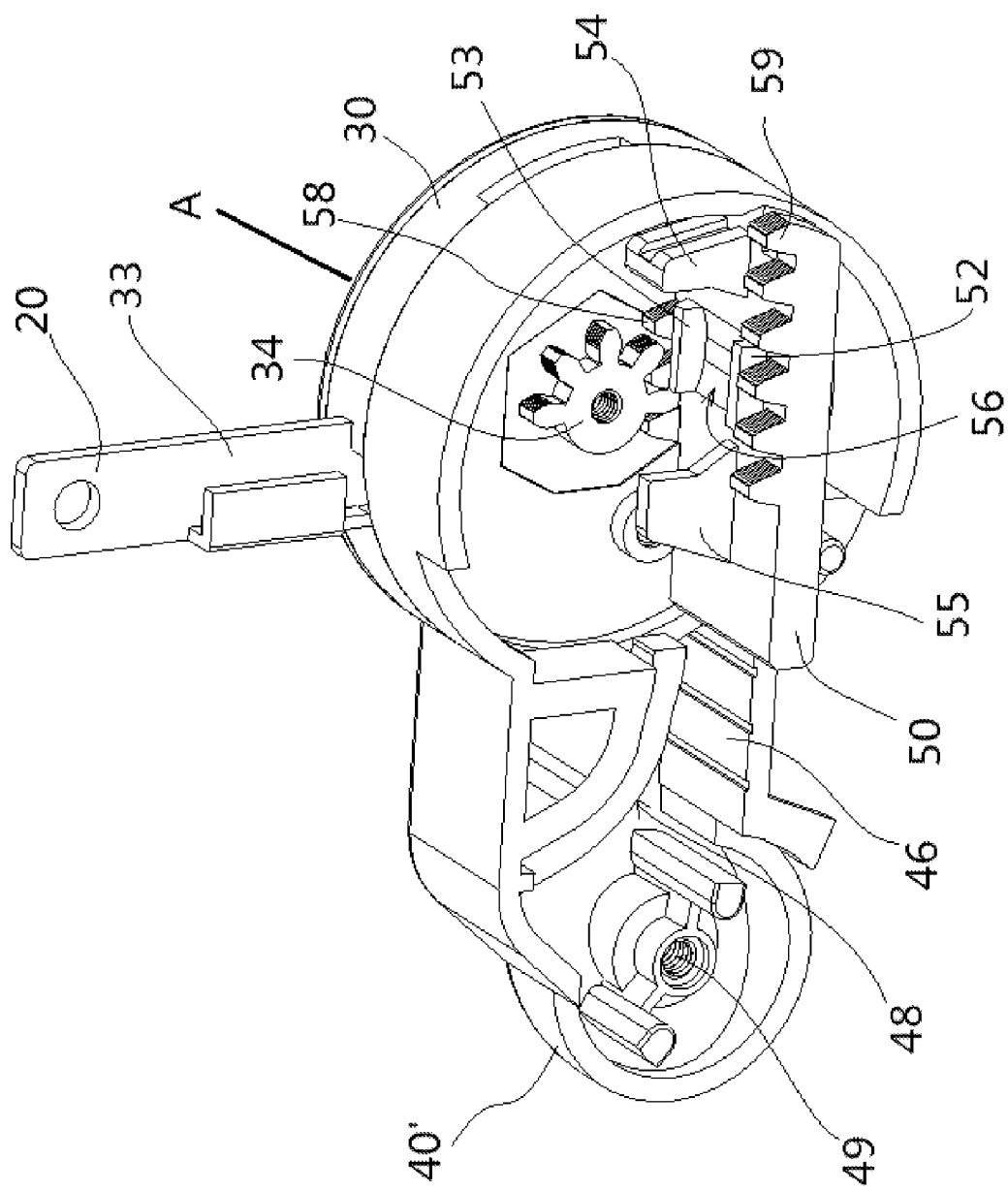
FIG. 5 is a perspective view of the first housing shell and first rotating member of FIG. 4, as assembled together, with a slide member, to form a subassembly portion of the joint structure of FIG. 1.

When the body portion 32 of the first rotating member 30 is received within the slot-shaped opening 42, the extension portion 33 (including the extension 20) of the first rotating member 30 remains outside of the slot-shaped opening 42, as shown in FIG. 5. When received within the slot-shaped opening 42, the first rotating member 30 is free to rotate about an axis A of the gear member 34. However, the extent of rotation is limited by the extension portion 33 abutting either end of the slot-shaped opening 42.

The first housing shell 40 includes a first slide surface 46 and a guide surface 48, which will be described in further detail, below. The first housing shell also includes a shell portion 40' which forms one of the ear-like projections 12' of the housing 12, discussed above. The shell portion 40' includes a threaded opening or receptacle 49, configured to receive a threaded end of the bolt 29 shown in FIG. 2, for securing the joint 12 to the leg member 16.

As shown in FIG. 5, a slide plate 50 is arranged on the first slide surface 46 of the first housing shell 40. As shown in the drawing of FIG. 5, the width dimension (into and out of the page) of the slide plate 50 is greater than the width dimension (into and out of the page) of the first slide surface 46, such that a portion of the width of the slide plate 50 rests on the first slide surface 46, while a further portion of the width of the slide plate 50 extends beyond (in the direction out of the page) the width of the first slide surface 46. As discussed, below with reference to FIG. 7, the further portion of the width of the slide plate 50 that extends beyond the width of the first slide surface 46 is arranged to rest and slide along a second slide surface 76 of the second housing shell 70.

When resting on the first and second slide surfaces 46 and 76, the slide plate 50 is free to move with rotation of the gear members 34 and 73, in a sliding motion along the longitudinal dimension of the slide surface 46 (i.e., in the right and left directions in the orientation shown in FIG. 5). One or both of the slide surfaces 46 and 76 may be provided with structure for increasing the frictional resistance to the sliding motion of the slide plate 50, to provide some tension for improved performance. In one example embodiment shown in the drawings, the slide surfaces 46 and 76 are provided with a series of grooves or undulations transverse to the longitudinal dimension of the slide surfaces 46 and 76, to increase friction. In other embodiments, other suitable grooves, undulations, surface roughness, surface coating or an additional layer of material on the slide surface(s) may be provided to increase friction. In yet other embodiments, one or both of the slide surfaces 46 and 76 may be formed smooth and without an additional coating or layer.

The slide plate 50 includes side projections 52 and 53, a front projection 54 and a rear projection 55, extending upward (relative to the orientation shown in FIG. 5) and defining a spring-receiving area 56 between the projections. The projections 52, 53, 54 and 55 may be shaped to provide stop surfaces that hold a spring member (e.g., spring member 60 shown in FIGS. 6 and 9, and/or inhibit movement of the spring member relative to the slide plate 50, when the spring member is received within the spring-receiving area 56.

The slide plate 50 includes a first row of serrations or teeth 58, arranged to engage with teeth of the first gear member 34. The slide plate 50 also includes a second row of serrations or teeth 59, arranged to engage with teeth of a second gear member 73 described below, with reference to FIGS. 7 and 9.

Figure 6:
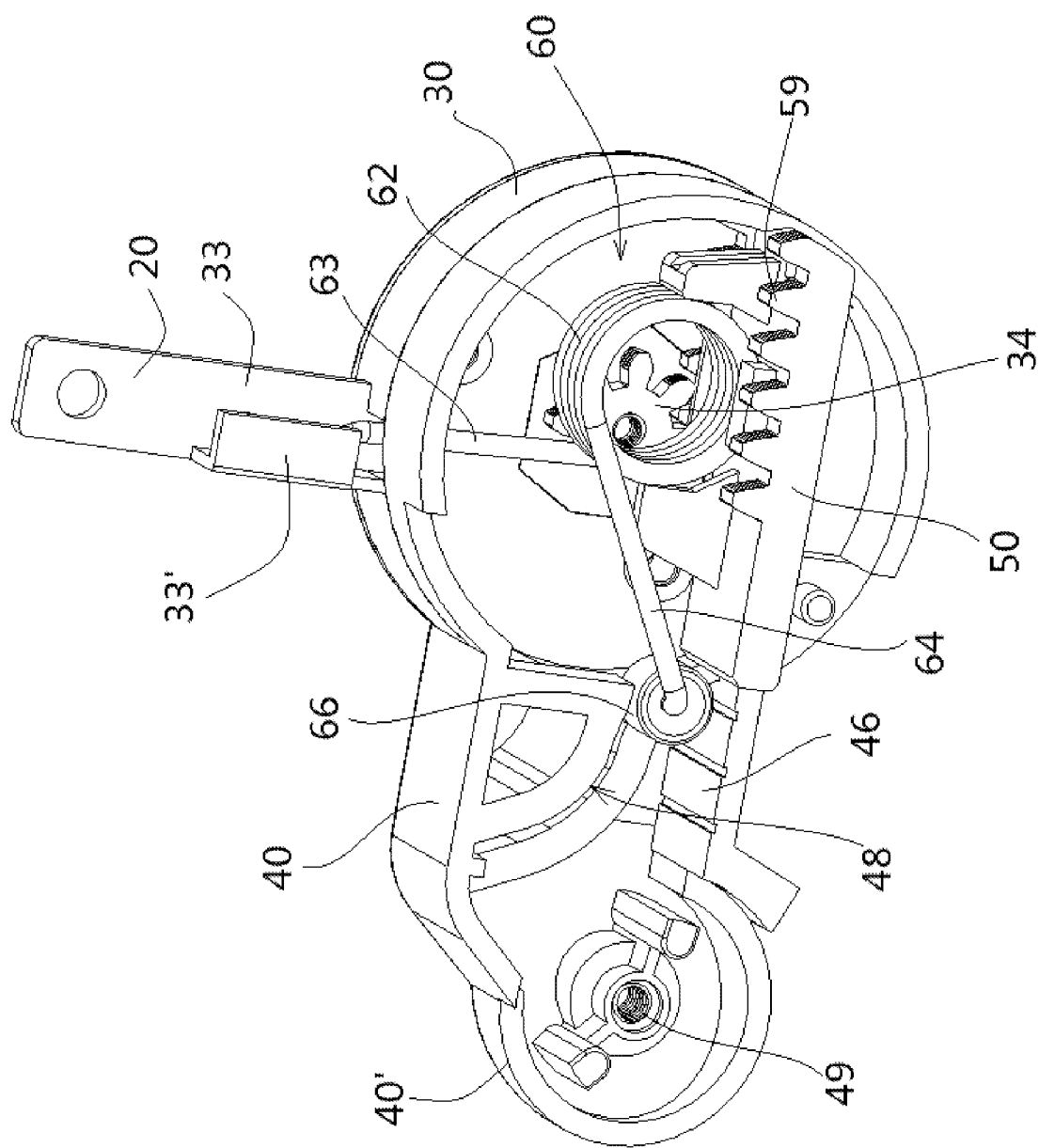
FIG. 6 is a perspective view of the subassembly FIG. 5, further assembled with a spring bias member.

As shown in FIG. 6, the spring member 60 is arranged within the spring-receiving area 56 (FIG. 5) of the slide member 50. In the embodiment of FIG. 6, the spring member 60 is a torsion spring composed of a coil portion 62, a first spring arm 63 and a second spring arm 64, where the first and second spring arms 63 and 64 are end portions of a same spring wire that forms the coil portion 62. The first spring arm 63 extends from the coil portion 62, through the opening 31' (FIG. 3) in the first rotating member 30 and to a location adjacent and along a portion of the length of the extension portion 33. The extension portion 33 may include an L-shaped protrusion 33' that provides a receptacle for receiving a portion of the first spring arm 63, to operatively attach the spring arm 63 to the extension portion. In other embodiments, the first spring arm 63 may be operatively attached to the extension portion 33 by other suitable structure including, but not limited to clamps, adhesive materials, or the like.

The second arm 64 of the spring member 60 extends toward the guide surface 48. A guide structure 66 (such as, but not limited to, a rotary wheel, a slidable guide surface, or the like) is provided on the end of the second arm 64 of the spring member 60. The guide structure 66 is forced, by the natural spring force of the spring member 60, against the guide surface 48. As described below, when the first rotatable member 30 rotates, the guide structure 66 is caused to move along the guide surface 48, while being forced against the guide surface 48 by the spring force of the spring member 60. In further embodiments, the guide surface 48 may comprise an end of the spring arm 64 (without the wheel 66).

Figure 7:
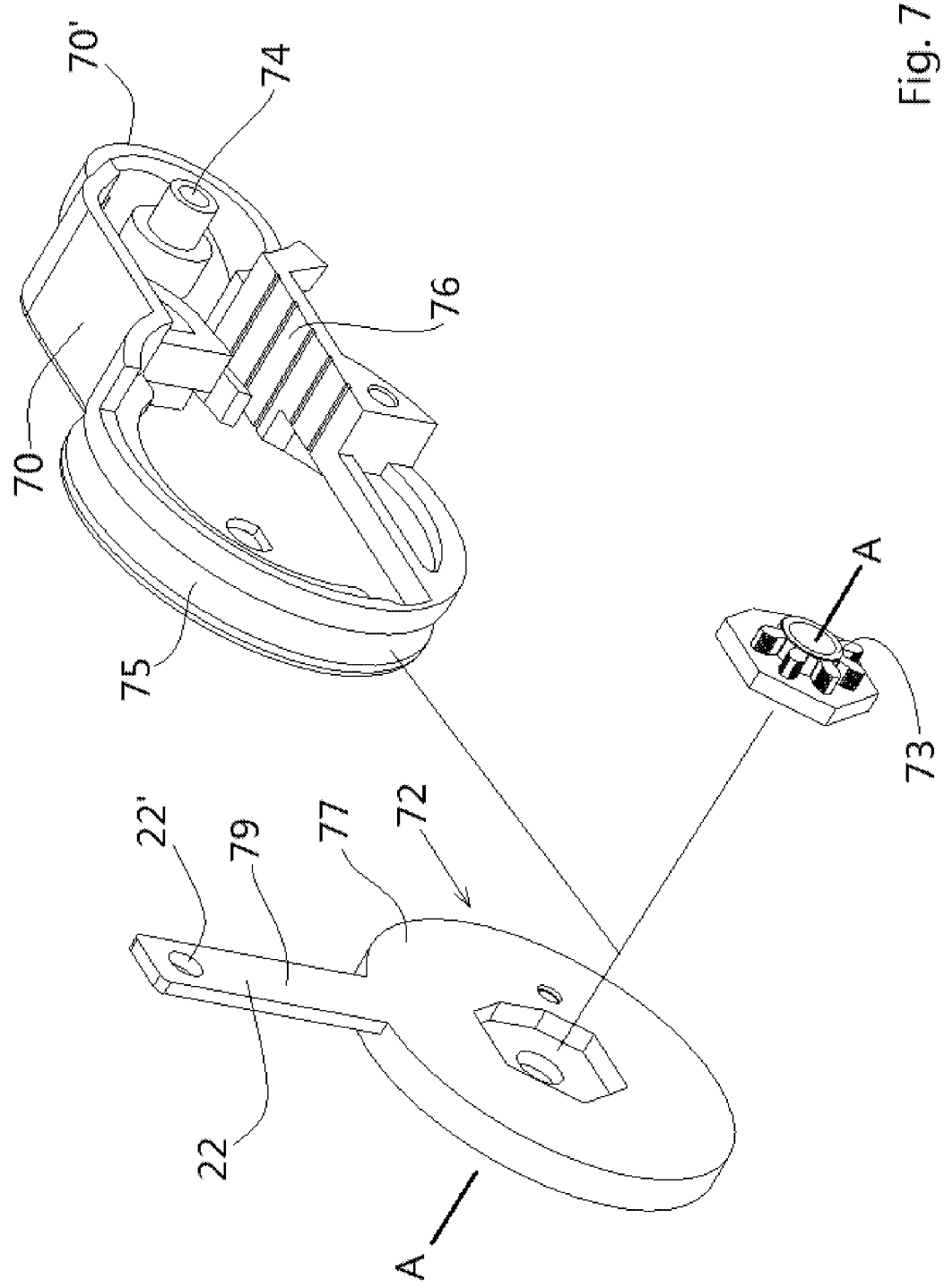
FIG. 7 is a perspective, partially exploded view of a second housing shell and a second rotating member of the joint structure in FIG. 1.

As shown in FIG. 7, the joint 12 also includes a second housing shell 70, a second rotating member 72 and a second gear member 73. The second housing shell 70 has a projecting portion 70' which forms one of the ear-like projections 12' of the housing 12, discussed above. The second housing shell 70 is configured similar to the first housing shell 40, discussed above, but in an opposite or mirror image thereof. However, instead of having a threaded opening or receptacle 49 (FIG. 4), the second housing shell 70 has a hole 74, through which the shaft of the bolt 29 (FIG. 2) extends.

The second housing shell 70 has a slot-shaped opening 75 (similar to the slot-shaped opening 42 in the first housing shell 40 shown in FIG. 4), for receiving the second rotating member 72. When received within the slot-shaped opening 75, the second rotating member 72 is free to rotate relative to the second housing shell 70.

The second housing shell 70 also has a second slide surface 76, similar to the first slide surface 46 of the first housing shell 40. In addition, the second housing shell 70 has a second guide surface 78 that is shaped similar to the first guide surface 48 of the first housing shell 40. When the first and second housing shells 40 and 70 are connected together (as described below, with respect to FIG. 8), the first and second slide surfaces 46 and 76 align together along their lengthwise side edges to form an full slide surface on which the slide member 50 rides. Also when the first and second housing shells 40 and 70 are connected together, one of the first and second guide surfaces 48 and 78 acts as the guide surface on which the guide member 66 rides. In the illustrated drawings, the first guide surface 48 acts as the guide surface on which the guide member 66 rides. In other embodiments in which the end of the spring arm 64 on which the guide member 66 attaches is turned to the opposite direction shown in FIG. 6 (i.e., turned in a direction out of the plane of the page), the guide member 66 rides on the second guide surface 78.

The second rotating member 72 is configured similar to the first rotating member 30, but does not include an annular wall or flange 31. The second rotating member 72 includes a body portion 77 and an extension portion 79, similar to the body portion 32 and extension portion 33 of the first rotating member 30. The extension portion 79 includes an end portion that corresponds to the extension 22 and includes the hole 22' shown in FIG. 2.

The second gear member 73 is supported on a base structure shaped to fit within a recess in the body portion 77 of the second rotating member 72, similar to the manner in which the base structure 35 fits within the shaped recess 36 of the first rotating member 30 discussed above. The second gear member 73 (and its base structure) includes a threaded hole that aligns with a hole in the second rotating member 72 and a further hole in the second housing shell 70 for receiving a shaft of a bolt (not shown), to secure the second gear member 73 to the second rotating member 72 and to hold the second rotating member 72 within the second housing shell 70 (similar to the manner in which the bolt 44 secures the first gear member 34 to the first rotating member 30 and holds the first rotating member 30 within the first housing shell 40, as discussed above with respect to FIG. 4). Alternatively, the second gear member 73 may be formed integral with the second rotating member 72, similar to the integral embodiment of the first gear member 34 and the first rotating member 30 discussed above.

Figure 8:
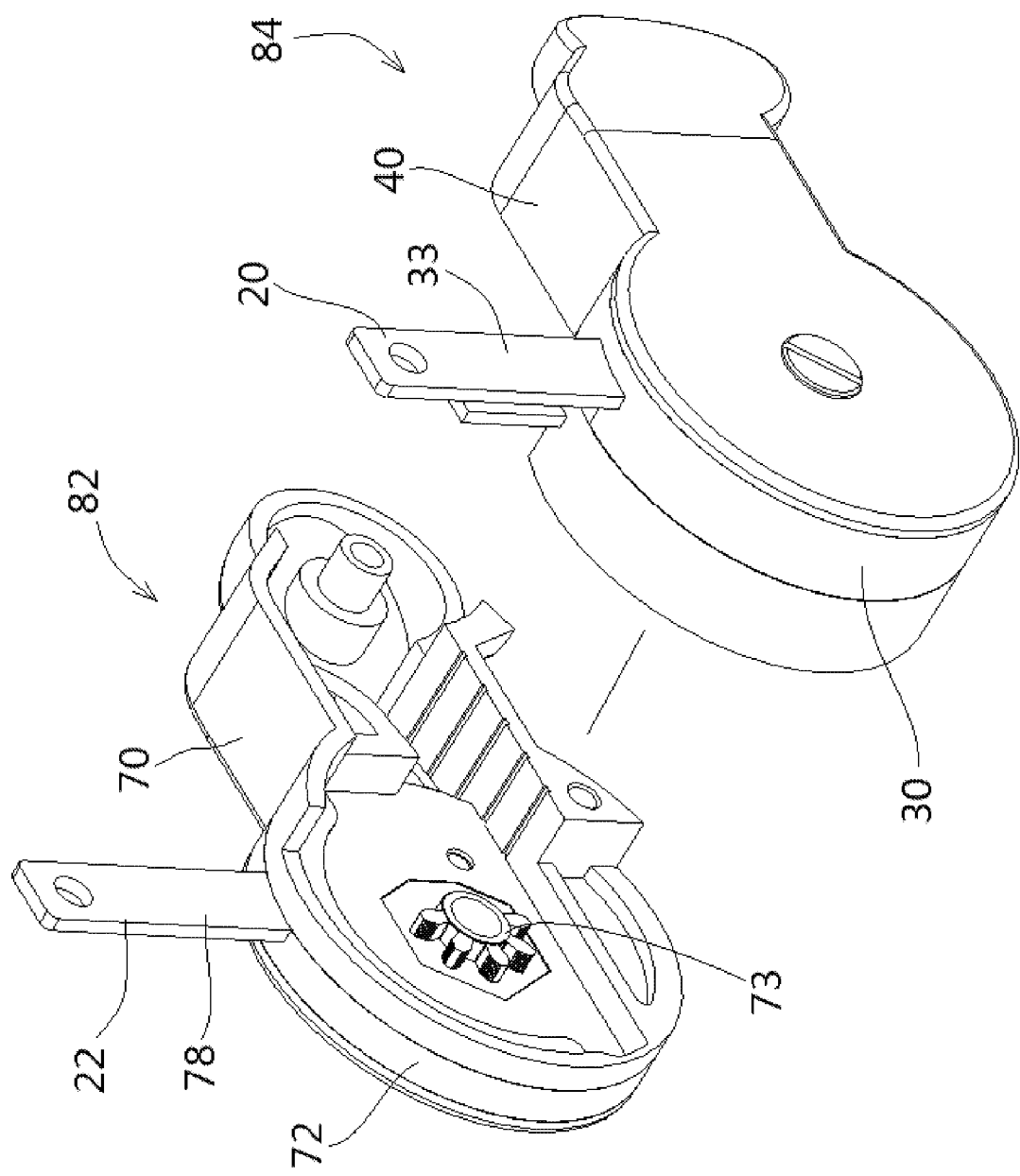
FIG. 8 is a perspective view of first and second subassemblies of the joint structure in FIG. 1.

The second rotating member 72 is assembled with the second housing shell 70 to form a first subassembly 82 (shown on the left side of FIG. 8). Similarly, the first housing shell 40, the first rotating member 30, the slide plate 50 and the spring member 60 are assembled to form a second subassembly 84 (shown in FIG. 6 and on the right side of FIG. 8). The two subassemblies 82 and 84 are connected together. In the illustrated embodiment, the two subassemblies are held together by the bolt 29 and by the arm member 14 that receives the extensions 20 and 22. In further embodiments, additional or alternative connectors may be employed to connect the two subassemblies 82 and 84 together, including, but not limited to screws, adhesive materials, clamps, or the like.

Figure 9:
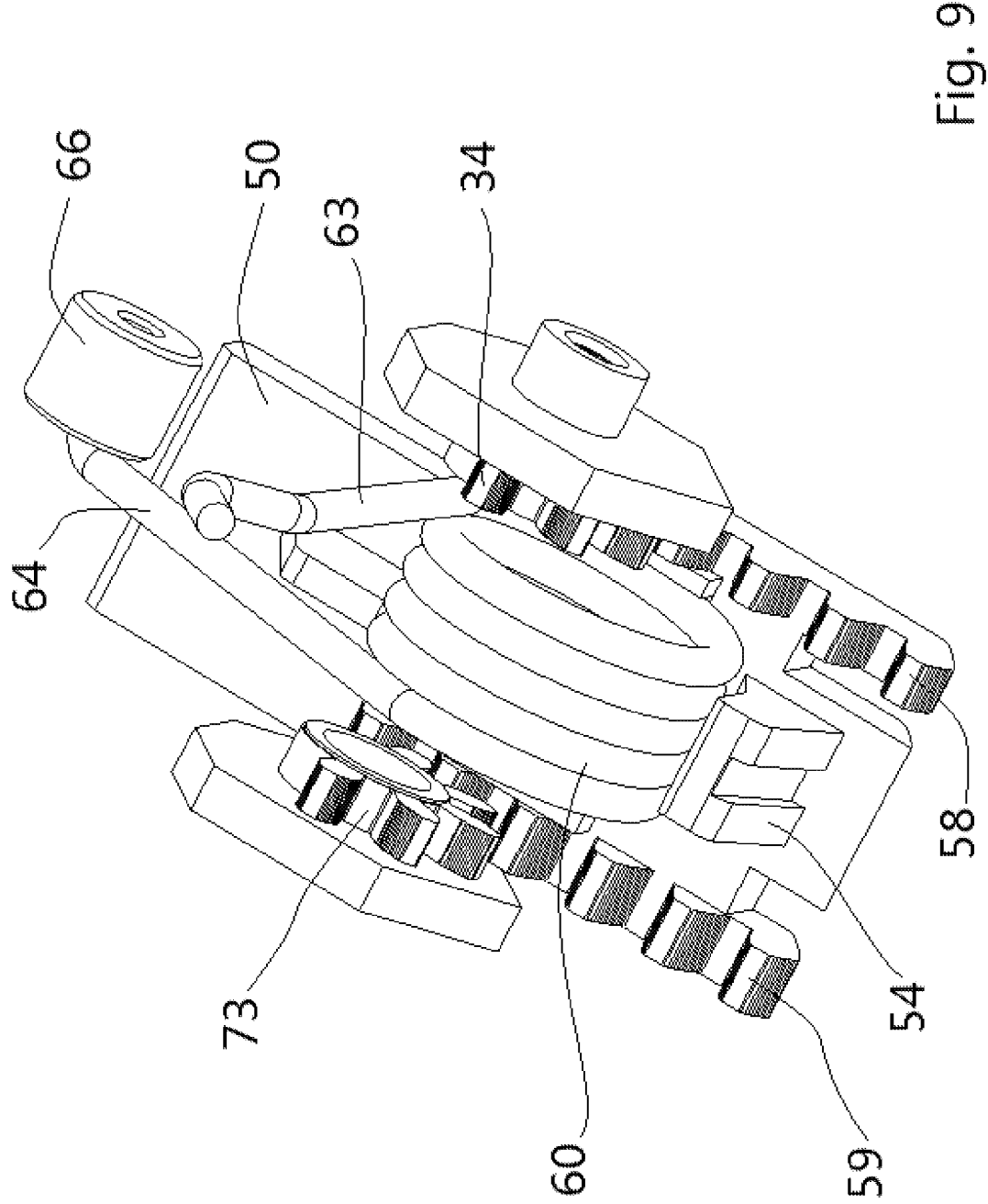
FIG. 9 is a perspective view of the bias member, gear members and a slide member within the assembled joint of FIG. 1.

When the two subassemblies 82 and 84 are connected together, the first and second gear members 34 and 73 engage the first and second rows of serrations or teeth 58 and 59, respectively, of the slide plate 50, as shown in FIG. 9. The drawing of FIG. 9 shows the gear members 34 and 73, the slide plate 50, the spring member 60 and the guide member 66 as they appear in their assembled form inside of the first and second housing shells 40 and 70, but without showing the first and second housing shells 40 and 70.

As shown in FIG. 9, when assembled, the teeth of the first gear member 34 engage the first row of serrations or teeth 58 on the slide plate 50. Similarly, the teeth of the second gear member 73 engage the second row of serrations or teeth 59 on the slide plate 50. In addition, the spring member 60 is held in a fixed position relative to the slide plate 50, within the spring-receiving area of the slide plate 50.

Figure 10A:
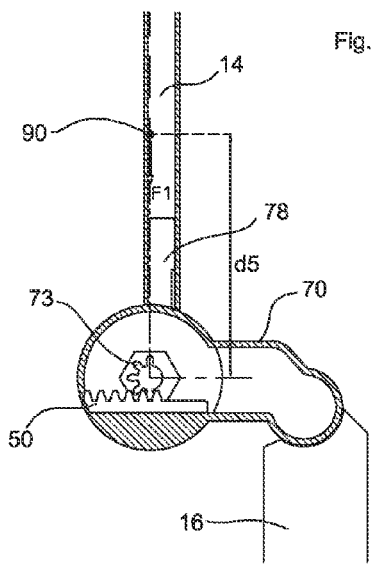
FIGS. 10a-e are schematic diagrams representing the joint of FIG. 1, at various pivot positions, including gravitational forces acting on the pivotal member.

Operation of the joint 12 is described with reference to FIGS. 10a-e and FIGS. 11a-e. In particular, the joint 12 operates to couple the arm member 14 to the leg member 16, as discussed above, and to allow the arm member 14 to move relative to the leg member by pivoting or rotating about the axis A. In one embodiment, the arm member 14 is allowed to pivot about 180 degrees, along a rotary path extending from a first pivot position shown in FIGS. 10a and 11a (in which the arm member 14 is directed vertically upward) to a second pivot position shown in FIGS. 10e and 11e. In other embodiments, the rotary path from the first pivot position to the second pivot position may be larger or smaller than 180 degrees. In each of FIGS. 10b-e, the angle that the arm member 14 is rotated from the first pivot position (upward vertical position) of FIG. 10a is represented by the reference characters C(2), C(3), C(4) and C(5), respectively. The reference character C(0) is used herein to represent the first pivot position (upward vertical position) of FIG. 10a.

The arm member 14 may be moved by manual force to any desired position along the rotary path to and between the first and second pivot positions. At each given position of the arm member 14 along the rotary path, the joint 12 provides a bias force on the arm member 14, sufficient to maintain the arm member 14 at the given position, against the force of gravity. However, the magnitude of the torque on the joint 12 resulting from the force of gravity differs at different pivot positions of the arm member 14 along the rotary path. Accordingly, the joint 12 is configured to provide a bias force on the arm member 14 that changes in magnitude as the arm member 14 is moved along the rotary path. Thus, the joint 12 provides a self-balancing effect, wherein the arm member 14 is balanced at any given position along its rotary path of motion.

The bias force on the arm member 14 is produced by the spring member 60 (FIGS. 6 and 9). The spring member 60 is not shown in the drawings of FIGS. 10a-e, so that other features (such as the gear member 73 and slide member 50) are more clearly in view. However, the spring member 60 is shown in the drawings of FIGS. 11a-e, at positions of the arm member 14 that correspond, respectively, to the arm positions shown in FIGS. 10a-e (i.e., at the angles C(0), C(2), C(3), C(4) and C(5)).

In operation, the spring member 60 is located in the spring-receiving area 56 of the slide member 50 and is held in a fixed relation with the slide member 50, as shown in FIGS. 6, 9 and 11a-e. As described below, as arm member 14 is moved to change its pivot position, the position of the spring member 60 moves to change the position of the guide member 66 on the guide surface 48. At the same time, the spring arm 63 is moved (with the motion of the arm member 14), such that the spring angle S (shown in FIGS. 11a-e) of the spring 66 changes with the changing position of the arm member 14. As a result, the magnitude of the bias force that the spring applies to the arm member 14 changes with the changing position of the arm member 14.

When the spring member 60 (FIGS. 6 and 11a-e) is under tension, it imparts a bias force on the arm member 14 (directed in the unwinding direction of the spring member), through the spring arm 63. In one example embodiments, the spring member 60 is selected to be in a released mode to provide no bias force (or a bias force of magnitude zero), when the arm member 14 is arranged in an upward vertical position (such as the vertical upward position of FIGS. 10a, 11a). In that position, the force F1 of gravity on the arm member 14 is directed vertically downward, such that no counter acting force from the spring member 60 is needed to balance the arm member 14 in those positions. In FIGS. 10a-e, the force F1 of gravity is shown as a vector extending from a point 90, representing the combined center of gravity of the arm member 14 and any structure (such as the light fixture housing 18) that is attached to the arm member 14.

In further embodiments, when the arm member 14 is in the vertically upward position (as shown in FIGS. 10a, 11a), the effect of gravity on the light fixture housing 18 (or other structure carried by or included on or in the arm member 14) may impart a torque on the arm member 14 that would cause the arm member 14 to rotate downward along its rotary path of motion. In such further embodiments, the spring member 60 may be selected to provide a counter acting bias force on the arm member 14 when the arm member 14 is in the vertical position of FIGS. 10a, 11a), sufficient to maintain the arm member 14 in the vertical position against the force of gravity.

Figure 10B:
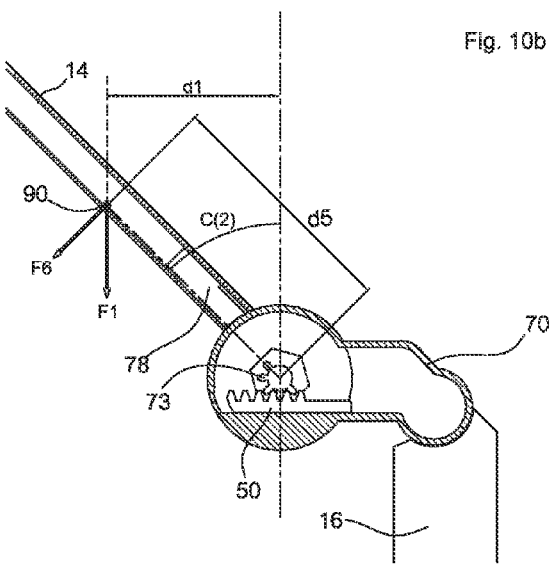

As the arm member 14 is moved from a vertical pivot position (such as shown in FIGS. 10a, 11a) to a non-vertical pivot position (such as shown in FIGS. 10b, 11b), the arm member 14 moves the spring arm 63 (FIGS. 6 and 11a-e) in a first direction (winding direction in the illustrated example embodiment), to tension the spring member 60. This causes the spring member 60 to impart a spring bias force on the arm member 14, in the return direction (the direction opposite to the direction that the arm member 14 was moved). More specifically, as the spring arm 63 of the spring member 60 is moved in the winding direction, the bending stress of the spring member 60 provides a force F2 on the guide member 66 on the guide surface 48, as well as a force F3 on the arm member 14.

The force F2 is directed tangential to the arched path that the guide member 66 follows as the coil 60 winds or unwinds. The force F3 on the arm member 14 has a perpendicular force component F4 (directed tangential to the rotary path of motion of the center of gravity 90 of the arm member 14, or perpendicular to an imaginary line crossing the center of gravity point 90 and the rotational axis A). In particular embodiments, the spring 60 is selected to provide forces F2 and F3 (and their component forces) of a magnitude to sufficiently oppose the vertical component F1 of the force of gravity at each pivot position of the arm member 14, to maintain the position of the arm member 14 at each pivot position.

Figure 10C:
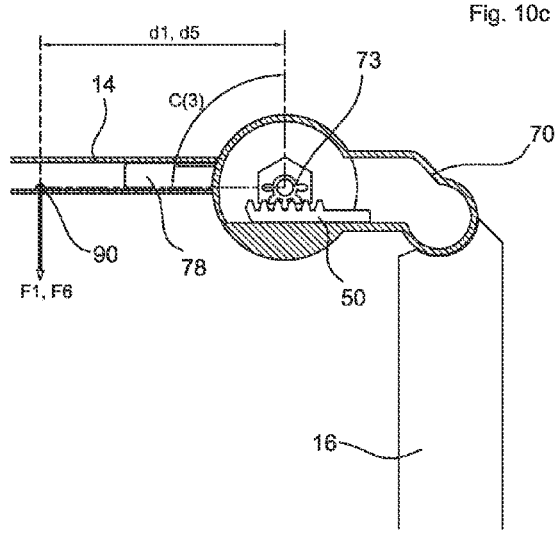
Figure 10D:
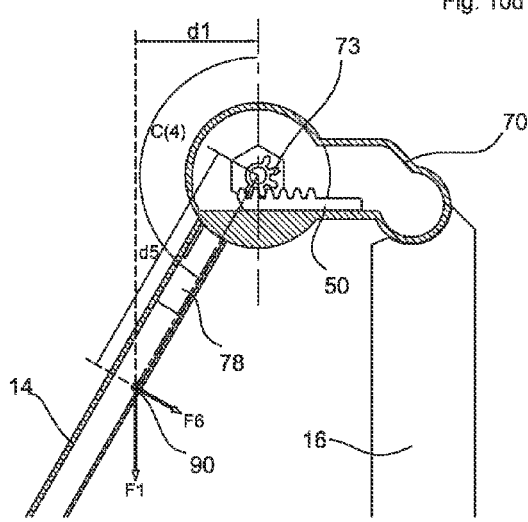
Figure 10E:
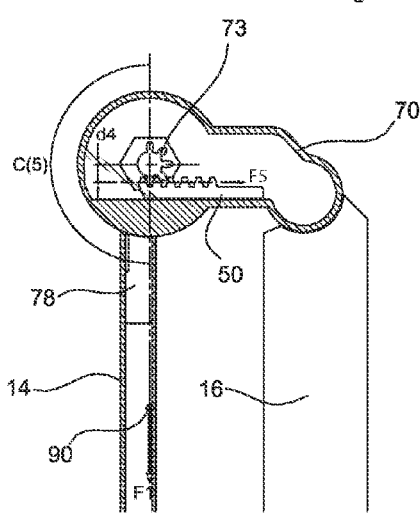

When the arm member 14 is in a non-vertical pivot position (for example, as shown in FIGS. 10b, 10c and 10d and corresponding FIGS. 11b, 11c and 11d), gravity acts on the arm member 14 and imparts a vertically downward directed force F1. The force F1 of gravity results in a force F6 at the center of gravity 90 (directed tangential to the rotary path of motion of the center of gravity 90, or perpendicular to an imaginary line crossing the center of gravity point 90 and the rotational axis A). The magnitude of F6 can be derived as follows:

$$F6 = F1 \times d1/d5 \quad \text{(Equation 1)}$$

where d1 is the horizontal distance from the center of gravity 90 of the arm member 14 to a vertical line crossing the axis A of rotation of the arm member 14, and where d5 is the linear distance from the center of gravity 90 to the axis A of rotation.

Because the arm member 14 is supported for rotary motion, the force F6 on the arm member results in a torque T. This torque Tg produced by the force of gravity on the arm member 14 can be derived, as follows:

$$Tg = F6 \times d5 \quad \text{(Equation 2)}$$

The force F6 on the arm member 14 would, normally, cause the arm member 14 to rotate downward. However, as described above, the spring 60 is selected to provide the bias force F3 on the arm member 14 to produce a torque in a direction opposite to and equal to the torque T, to maintain the arm member 14 in its rotary position, without requiring an external force to support the arm member 14 in that position.

As the arm member 14 is moved (pivoted or rotated) from a vertical pivot position (such as shown in FIGS. 10a, 11a) to a non-vertical pivot position (such as shown in FIGS. 10b, 11b), not only does the spring arm 63 (FIGS. 6 and 11a-e) move in a first direction (for example, winding direction), but, in addition, the slide plate 50 moves (e.g., slides) along the longitudinal dimension of the slide surfaces 46 and 76, to change the position of the spring member 60 relative to the axis of rotation of the arm member 14. In particular, as the arm member 14 pivots, the rotary motion of the arm causes the gear members 34 and 73 to rotate about the axis A. As the gear members 34 and 73 rotate, the slide plate 50 is caused to move along the slide surfaces 46 and 76 (due to the meshing of the teeth of the rotating gear members and the linear arrays of teeth of the slide plate).

In this manner, the gear members 34 and 73 and the sliding plate 50 move the spring member 60 toward the right (relative to the orientation shown in FIGS. 10a-e and 11a-e), as the arm member 14 is pivoted downward. Similarly, the gear members 34 and 73 and the sliding plate 50 move the spring member 60 toward the left (relative to the orientation shown in FIGS. 10a-e and 11a-e), as the arm member 14 is pivoted upward. The distance that the slide plate 50 is moved along the slide surfaces 46 and 76 is dependent upon the amount of rotation of the gear members 34 and 73.

Accordingly, the position of the spring member 60 (fixed to the slide plate 50) is moved with the slide plate 50, by a distance dependent upon the amount of rotation of the arm member 14. As a result, the position of the guide member 66 on the guide surface 48 is moved by a distance dependent upon the amount of rotation of the arm member 14. As shown in FIG. 11b, the guide member 66 is positioned on near a free end of the projecting surface of the guide surface 48 (toward the left side of the guide surface 48 in the orientation of FIG. 11b). As the arm member 14 is rotated downward, the spring 60 and, thus, the guide member 66, move toward the right relative to the orientation in FIGS. 11c-e. As shown in FIG. 11c, the arm member 14 is moved to a horizontal position, which resulted in a movement of the spring member 60 and the guide member 66, such that the guide member 66 is positioned toward the center of the guide surface 48. As the arm member 14 is moved yet further along its rotary path to a position as shown in FIGS. 11d and 11e, the spring member 60 and the guide member 66 are correspondingly moved, such that the guide member 66 is positioned further along the guide surface 48.

The spring 60 provides a counter lateral force F5 as a lateral component of F2. More specifically, the force F2 results in reactive forces F7 and F7'. where F7 is directed normal to and out from the guide surface 48, while F7' is directed along the spring arm 63, toward the coil portion of the spring. As the system is at rest, the aggregate sum of the forces F2, F7 and F7' is zero. The lateral component force F5 is the absolute aggregate sum of the horizontal force components of F2, F7 and F7'. In embodiments in which the guide surface 48 is shaped such that the force F2 is mostly vertical at all times, the lateral component force F5 can be estimated as:

$$F5 = |CF7'| + |F7'|, \quad \text{(Equation 3)}$$

where |CF7'| is the compliment of F7'.

The counter lateral force F5 is dependent on the position of the guide member 66 on the guide surface 48. Accordingly, as the arm member 14 is moved along its rotary path and causes the guide member 66 to move along the guide surface 48, the force F5 changes in relation to the position of the arm member along the rotary path. As the guide member 66 moves rightward on the guide surface 48, an angle Q increases and the sum $|CF7'| + |F^{7'}|$(thus, F5) increases. The angle Q is the angle between a line normal to the guide surface at the point at which the guide member 66 contacts the guide surface 48, and a line tangent to the arch of motion of the guide member 66. The angle Q is dependent upon (and, thus, can be controlled by appropriately selecting) the curvature of the guide surface 48. In that regard, the specific lateral forces F5 desired at each pivot position can be selected and defined by selecting and defining the curvature of the guide surface 48 at each position of the guide member 66.

The torque Ts applied to the arm member 14 by the spring member 60 is a function of the force F5 and can be derived as follows:

$$Ts = F5 \times d4 \quad \text{(Equation 4)}$$

where d4 is the distance from the axis A to the point where the lateral force F5 is applied to the gears 34 and 73. The lateral force F5 acts on the sliding member 50 to cause the teeth 58 and 59 to pull on the gears 34 and 73, such that the lateral force F5 is applied where the teeth 58 and 59 and gears 34 and 73 contact.

Figure 12:
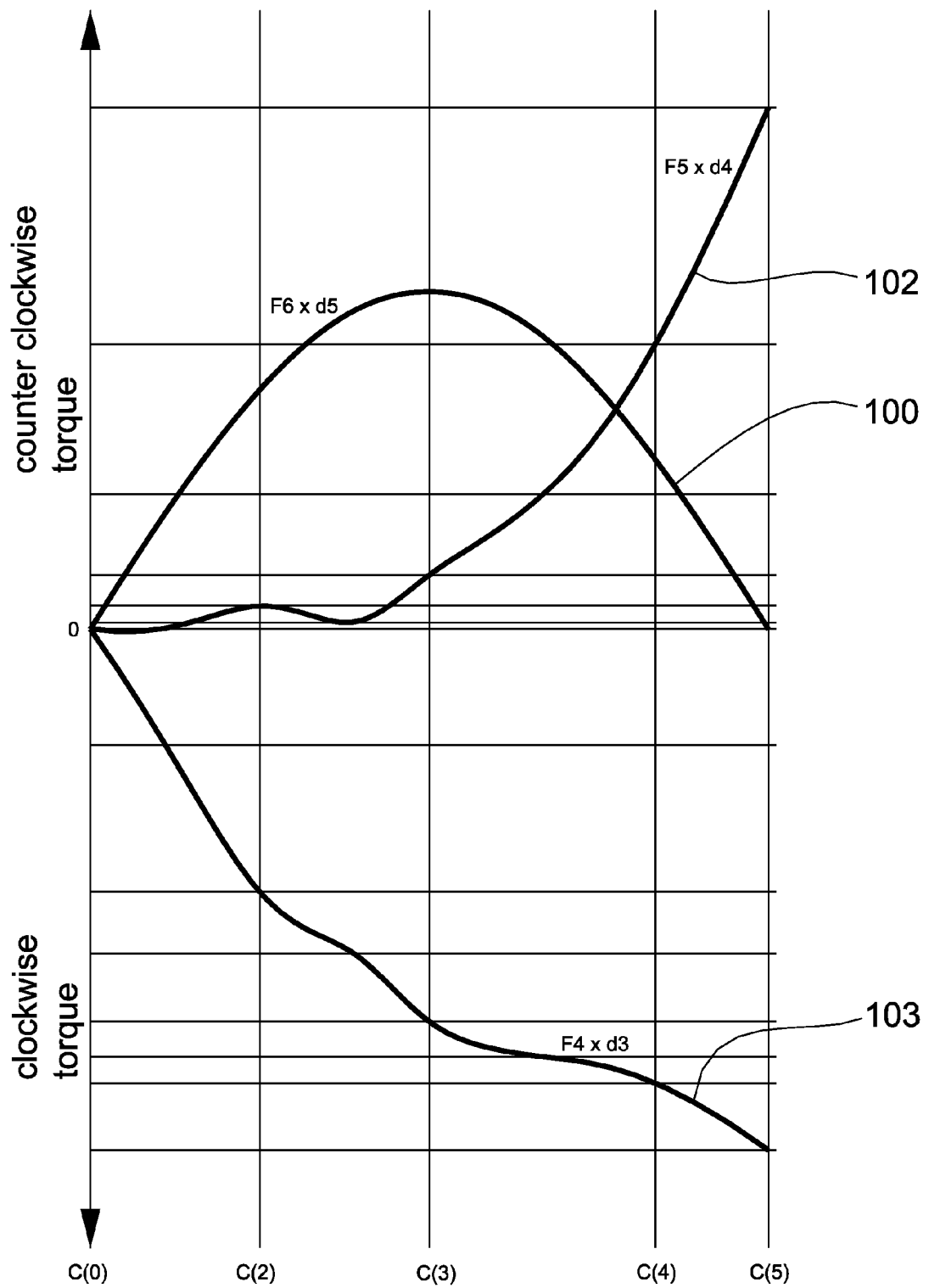
FIG. 12 is a diagram representing an example of various torques on the pivotal member that change with the pivotal position of the pivotal member.

Thus, as the spring member 60 moves, the force F5 changes (as described above) and, as a result, the magnitude of the torque Ts applied to the arm member 14 by the spring member 60 changes. An example of a graphical representation of such torques is shown in FIG. 12, where curve 100 shows the torque Tg on the arm member 14 resulting from gravity, along the rotational path of the arm member 14, where that gravitational torque Tg is derived by equation 2 (i.e, Tg=F6×d5). FIG. 12 also shows a curve 102 representing the torque Ts applied to the arm member 14 by the spring member 60, where Ts is derived by Equation 4 (i.e., Ts=F5×d4). FIG. 12 also shows a curve 103 representing the torque Tp provided by the perpendicular force component F4 of the force F3 of the bending stress of the spring member 60 on the arm member, where Tp is derived by the equation:

$$Tp=F4 \times d3 \quad \text{(Equation 5)}$$

where d3 is the linear distance from the rotary axis A of the arm member 14 to a point of contact of the spring arm 63 with the extension portion 33. If a length section of the spring arm 63 were in contact with the extension portion 33, such that the spring force F4 is distributed evenly over the length section, then the distance d3 is measured from the rotary axis A to a point at the center of that length section to the spring arm 63.

Figure 13:
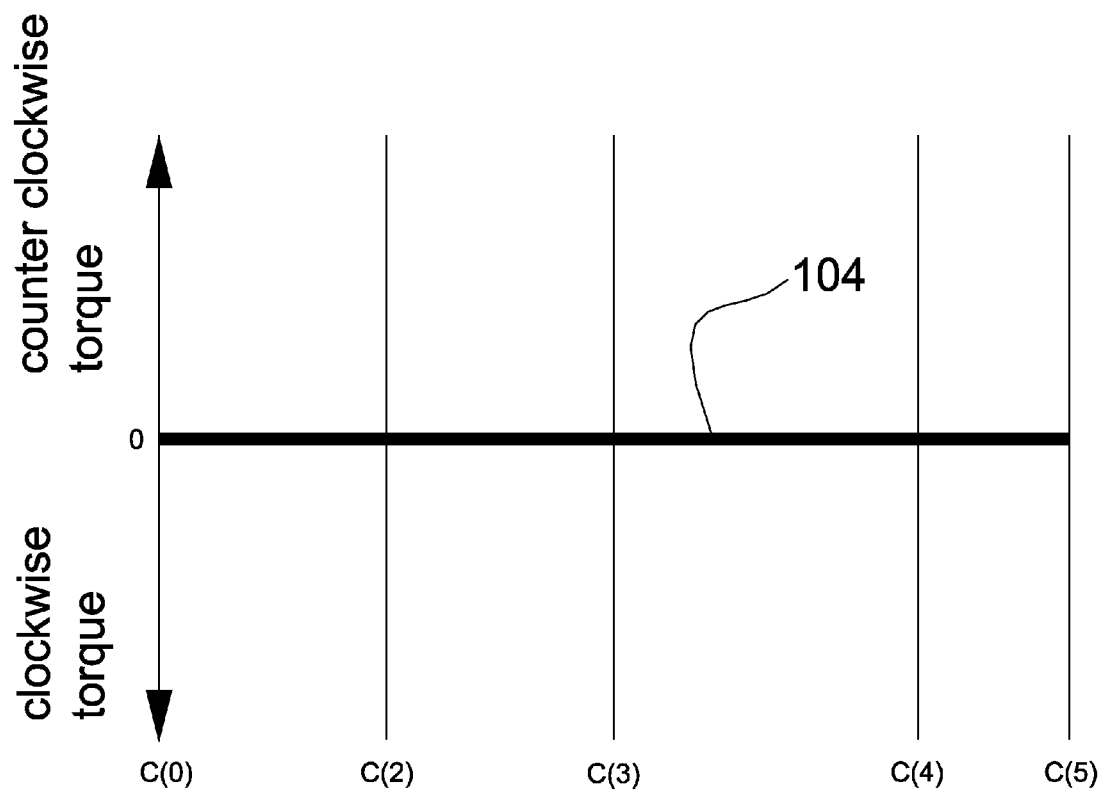
FIG. 13 is a diagram representing an aggregation of the torques shown in FIG. 12, over the pivotal motion of the pivotal member.

The spring member 60 is selected to have a spring tension that provides forces F4 and F5 that result in a combined torque Ts+Tp that is equal to and directed opposite the torque Tg resulting from gravity, at each pivot position of the arm member 14 along its rotary path of motion. That relationship is represented by the flat graph 104 shown in FIG. 13, where the total torque Tt acting upon the arm member 14 is zero. More specifically, the spring member 60 is selected such that:

$$Tt=0=[(F5 \times d4)+(F4 \times d3)]+(F6 \times d5) \quad \text{(Equation 6)}$$

As a result, the overall torque provided by the spring member 60 can counter (or cancel out) the torque from gravity on the arm member 14. In that regard, the arm member 14 may be moved to any pivot position along its rotary path of motion and, once placed in that position, will remain in that position without additional support. The arm member 14 will appear to balance itself at any of its pivot position, to provide a self-balancing effect.

However, in other embodiments, the spring member 60 (and/or dimensions d4, d3 and d5) may be selected such that the overall total torque Tt is not equal to zero. For example, other embodiments may be configured to allow the arm member 14 to be moved upward by the torques applied by the spring member 60 (or to move downward by the torque provided by gravity).

Components of the joint 12 described herein may be made of any suitable material or materials. For example, each of the first and second rotating members 30 and 70, the first and second gear members 34 and 73 (and corresponding base members), the housing shells 40 and 70, and the slide member 50 may be made of any one or more suitably rigid materials including, but not limited to plastic, metal, wood, ceramic or composite materials. The spring member 60 may be made of any suitable spring material, including, but not limited to metal, plastic or composite materials. Connection hardware, including bolts, screws, nuts, rivets or the like described herein, may be made of any suitably rigid material, including, but not limited to metal, plastic, wood, ceramic or composite materials.

While particular embodiments of the present invention have been shown and described, it will be obvious to those skilled in the art that the invention is not limited to the particular embodiments shown and described and that changes and modifications may be made without departing from the spirit and scope of the appended claims. For example, in further embodiments of the present invention, the shapes and dimensions of various components and features may differ from those shown in the drawings. Furthermore, embodiments may be formed with a single rotating member (instead of first and second rotating members 30 and 72). Yet further embodiments may be formed with more than two rotating members. Also, while embodiments shown in the drawings include first and second slide surfaces 46 and 76 and first and second guide surfaces 48 and 78, in the first and second housing shells 40 and 70, respectively, other embodiments may employ a single sufficiently wide slide surface and/or a single sufficiently wide guide surface on one of the two housing shells 40 and 70. Also, while embodiments shown in the drawings include first and second housing shells 40 and 70, other embodiments may employ a housing formed of a single housing shell or more than two housing shells.

What is claimed is:

1. A joint device comprising:
a housing having a slide surface and a guide surface;
a first rotating member supported for rotation by the housing;
a slide member supported for movement on and relative to the slide surface; and
a spring member supported on the slide member, the spring member having a spring arm operatively coupled to the first rotating member, and a second spring arm arranged for movement along the guide surface as the slide member moves along the slide surface;
a gear member arranged in a fixed relation to the first rotating member, for rotating with the first rotating member, the gear member having a plurality of gear teeth;
wherein the slide member has a plurality of teeth arranged to engage gear teeth of the gear member, such that rotation of the gear member with rotation of the first rotating member causes the gear member to move the slide member in a linear direction along the slide surface;
wherein rotation of the first rotating member with respect to the housing causes the spring member to impart a bias torque on the first rotating member, the bias torque having a magnitude that changes as the slide member moves linearly along the slide surface.

2. The joint device of claim 1, wherein the slide member is operatively connected to the first rotating member for movement on and relative to the slide surface with rotation of the first rotating member.

3. The joint device of claim 1, further comprising a second rotating member supported for rotation within the housing, the second rotating member having a second gear member having a plurality of gear teeth, wherein the slide member has a second plurality of teeth arranged to engage gear teeth of the second gear member.

4. The joint device of claim 1, further comprising:
a second rotating member supported for rotation by the housing;
a second gear member arranged in a fixed relation relative to the second rotating member, the second gear member having a plurality of gear teeth;
wherein the slide member has a second plurality of teeth arranged to engage the plurality of gear teeth of the second gear member.

5. The joint device of claim 4, wherein at least one of the first rotating member and the second rotating member includes a connection portion for connection to a pivot member.

6. The joint device of claim 1, wherein the first rotating member includes a connection portion for connection to a pivot member.

7. The joint device of claim 1, wherein the first rotating member includes an extension portion for connection to a pivotal arm.

8. The joint device of claim 1, wherein the spring comprises a torsion spring.

9. A joint system comprising:
- a first member;
- a second member;
- a joint device connecting the first member and second member for pivotal motion of at least one of the first member and the second member, the joint device comprising:
  - a housing having a slide surface and a guide surface;
  - a first rotating member supported for rotation by the housing;
  - a slide member supported for movement on and relative to the slide surface; and
  - a spring member supported on the slide member, the spring member having a spring arm operatively coupled to the first rotating member, and a second spring arm arranged for movement along the guide surface as the slide member moves along the slide surface;
  - a gear member arranged in a fixed relation to the first rotating member, for rotating with the first rotating member, the gear member having a plurality of gear teeth;
  - wherein the slide member has a plurality of teeth arranged to engage gear teeth of the gear member, such that rotation of the gear member with rotation of the first rotating member causes the gear member to move the slide member in a linear direction along the slide surface;
  - wherein rotation of the first rotating member with respect to the housing causes the spring member to impart a bias torque on the first rotating member, the bias torque having a magnitude that changes as the slide member moves linearly along the slide surface.

10. The joint system of claim 9, wherein the slide member is operatively connected to the first rotating member for movement on and relative to the slide surface with rotation of the first rotating member.

11. The joint system of claim 9, wherein the first member comprises an arm member and wherein the second member comprises a leg member, the joint device connecting the arm member to the leg member, for pivotal motion of the arm member, the arm member supporting an implement.

12. The joint system of claim 11, wherein the implement comprises a light fixture housing that holds at least one electronic light emitting device.

13. The joint system of claim 9, further comprising:
- a second rotating member supported for rotation by the housing;
- a second gear member arranged in a fixed relation relative to the second rotating member, the second gear member having a plurality of gear teeth;
- wherein the slide member has a second plurality of teeth arranged to engage the plurality of gear teeth of the second gear member.

14. A method of making a joint device, the method comprising:
- providing a housing having a slide surface and a guide surface;
- supporting a first rotating member by the housing; supporting a slide member for movement on and relative to the slide surface;
- arranging a spring member on the slide member; operatively coupling an arm of the spring member to the first rotating member;
- arranging a second arm of the spring member on the guide surface for movement along the guide surface as the slide member moves along the slide surface;
- arranging a gear member in a fixed relation to the first rotating member, for rotating with the first rotating member, the gear member having a plurality of gear teeth;
- providing the slide member with a plurality of teeth arranged to engage gear teeth of the gear member, such that rotation of the gear member with rotation of the first rotating member causes the gear member to move the slide member in a linear direction along the slide surface; and
- rotating the first rotation member with respect to the housing such that the spring member imparts a bias torque on the first rotating member, the bias torque having a magnitude that changes as the slide member moves linearly along the slide surface.

15. The method of claim 14, further comprising operatively connecting the slide member to the first rotating member for movement on and relative to the slide surface with rotation of the first rotating member.

16. The method of claim 14, further comprising:
- supporting a second rotating member for rotation by the housing;
- arranging a second gear member in a fixed relation relative to the second rotating member, for rotation with the rotation of the second rotating member, the second gear member having a plurality of gear teeth;
- wherein the slide member has a second plurality of teeth arranged to engage the plurality of gear teeth of the second gear member.

* * * * *